US010748346B2

(12) United States Patent
Chia et al.

(10) Patent No.: US 10,748,346 B2
(45) Date of Patent: Aug. 18, 2020

(54) PLACING AND SOLVING CONSTRAINTS ON A 3D ENVIRONMENT

(71) Applicant: Microsoft Technology Licensing, LLC, Redmond, WA (US)

(72) Inventors: Alvin Wen Jie Chia, Bellevue, WA (US); Michael J. Ebstyne, Seattle, WA (US); Larry Marvin Wall, Redmond, WA (US); Trebor L. Connell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 16/003,985

(22) Filed: Jun. 8, 2018

(65) Prior Publication Data

US 2019/0378340 A1 Dec. 12, 2019

(51) Int. Cl.
*G06F 17/27* (2006.01)
*G06T 19/20* (2011.01)
(Continued)

(52) U.S. Cl.
CPC .......... *G06T 19/20* (2013.01); *G06F 16/583* (2019.01); *G06F 40/205* (2020.01);
(Continued)

(58) Field of Classification Search
CPC .... G05T 19/20; G06F 16/583; G06F 17/2705
See application file for complete search history.

(56) References Cited

U.S. PATENT DOCUMENTS 8,893,048 B2 * 11/2014 Gupta ................. G06F 3/04815
715/848
2012/0290987 A1 11/2012 Gupta
(Continued)

OTHER PUBLICATIONS

Terrence Fernando, Norman Murray, Kevin Tan and Prasad Wimalaratne, "Software Architecture for a Constraint-based Virtual Environment," Proceedings of the ACM symposium on Virtual reality software and technology, 1999, pp. 147-154 (Year: 1999).*
(Continued)

*Primary Examiner* — Sing-Wai Wu

(57) ABSTRACT

Systems and methods are disclosed for permitting the use of a natural language expression to specify object (or asset) locations in a virtual three-dimensional (3D) environment. By rapidly identifying and solving constraints for 3D object placement and orientation, consumers of synthetics services may more efficiently generate experiments for use in development of artificial intelligence (AI) algorithms and sensor platforms. Parsing descriptive location specifications, sampling the volumetric space, and solving pose constraints for location and orientation, can produce large numbers of designated coordinates for object locations in virtual environments with reduced demands on user involvement. Converting from location designations that are natural to humans, such as "standing on the floor one meter from a wall, facing the center of the room" to a six-dimensional (6D) pose specification (including 3-D location and orientation) can alleviate the need for a manual drag/drop/reorient procedure for placement of objects in a synthetic environment.

20 Claims, 12 Drawing Sheets

(51) Int. Cl.
G06F 16/583 (2019.01)
G06F 40/205 (2020.01)
G06T 19/00 (2011.01)

(52) U.S. Cl.
CPC .... *G06T 19/006* (2013.01); *G06T 2219/2004* (2013.01); *G06T 2219/2016* (2013.01)

(56) References Cited

U.S. PATENT DOCUMENTS

2018/0045963 A1 2/2018 Hoover et al.
2018/0122043 A1 5/2018 Energin et al.

OTHER PUBLICATIONS

M. Kefi, P. Richard, T. Hoang, T. Yamaguchi and V. Barichard, "Using Constraint Solver for 3D Layout Assistance in Human-scale Virtual Environment," Proc. of the 12th International Joint Conference on Computer Vision, Imaging and Computer Graphics Theory and Applications (VISIGRAPP 2017), pp. 27-38. (Year: 2017).*
Ken Xu, James Stewart and Eugene Fiume, "Constraint-based Automatic Placement for Scene Composition," In Graphics Interface Proceedings, University of Calgary, 2002 (Year: 2002).*
"International Search Report and Written Opinion Issued in PCT Application No. PCT/US19/033194", dated Sep. 18, 2019, 11 Pages.

* cited by examiner

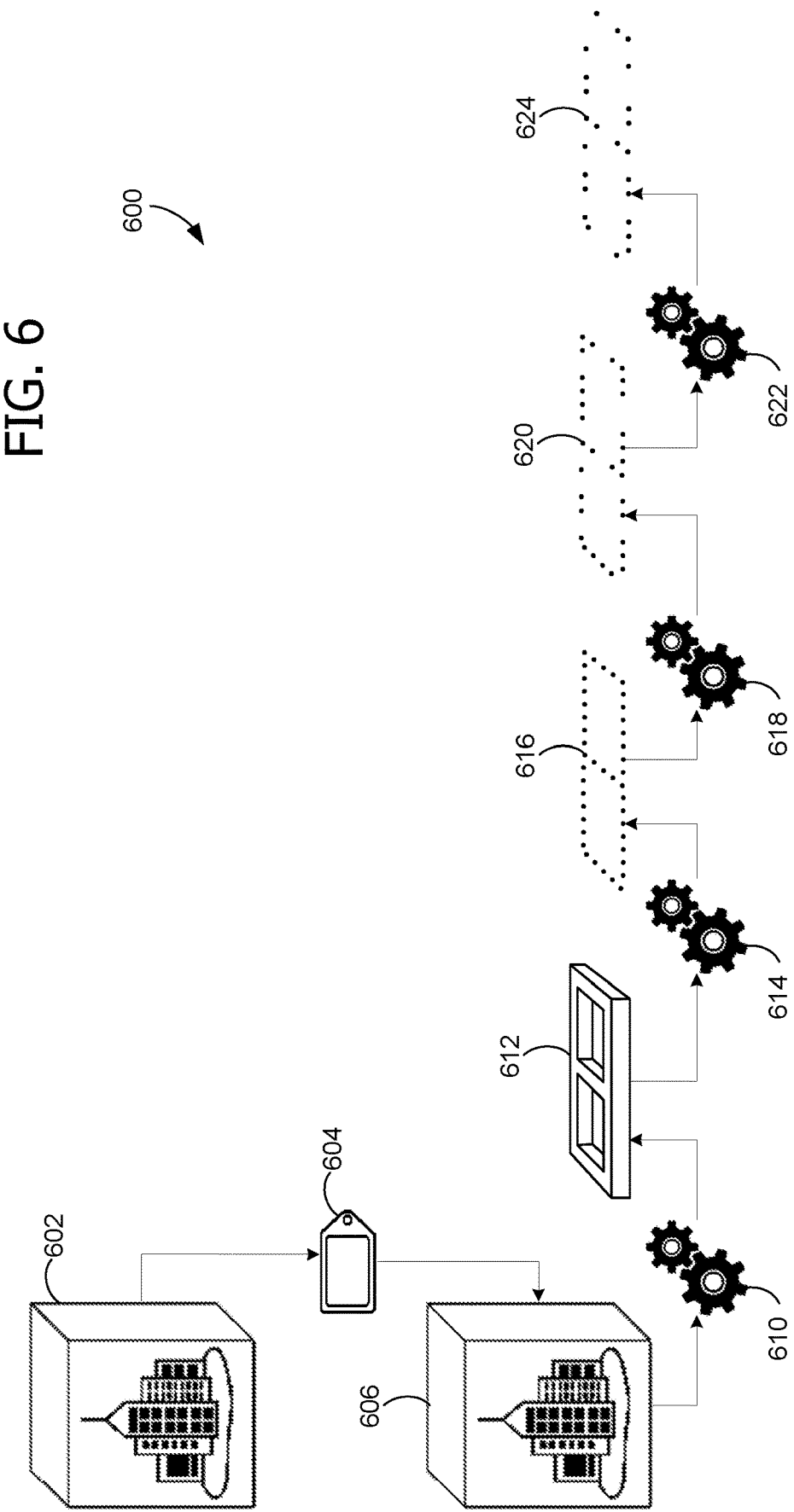

```
struct Cone {
   SXFVec direction;
   float angle; };
struct Anchor {
   SXVec position;
   Cone direction; };
enum class PlacementOpType : byte {
   AnchorCreate,
   AnchorSubtract,
   QueryLabel,
   QueryJoint,
   ConstrainDirection,
   ConstrainDistance };
struct PlacementOp {
   PlacementOpType type; };
struct AnchorCreate {
   PlacementOp super;
   Anchor anchor;
   AnchorCreate(const Anchor& anchor) {} };
enum class AnchorSubtractBehavior : byte {
   DirectionIsPositionDifference,
   DirectionIsDirectionDifference };
struct AnchorSubtract {
   PlacementOp super;
   uint instructionLhs;
   uint instructionRhs;
   float coneAngle;
   // If behavior is position difference the direction will be normalized difference in positions.
   // If behavior is directions difference the direction will be {0, 0, 1} + direction difference.
   AnchorSubtractBehavior behavior;
   AnchorSubtract(uint instructionLhs, uint instructionRhs, float coneAngle, AnchorSubtractBehavior behavior)
   {} };
enum class AnchorQueryShapeType {
   OriginPoint,
   BoundingBox,
   BoundingHull,
   Mesh };
```

```
struct AnchorQueryLabel {
    PlacementOp super;
    const char* label;
    AnchorQueryShapeType shapeType;
    float coneAngle;
    AnchorQueryLabel(const char* label, AnchorQueryShapeType shapeType, float coneAngle) {} };
struct AnchorQueryJoint {
    PlacementOp super;
    uint asset;
    const char* joint;
    float coneAngle;
    AnchorQueryJoint(uint asset, const char* joint, float coneAngle){} };
struct ConstrainDirection {
    PlacementOp super;
    uint instruction;
    Cone cone;
    ConstrainDirection(uint instruction, Cone cone){} };
struct ConstrainDistance {
    PlacementOp super;
    uint asset;
    AnchorQueryShapeType assetShape;
    uint instruction;
    float min;
    float max;
    ConstrainDistance(uint asset, AnchorQueryShapeType assetShape, uint instruction, float min, float max){} };
struct PlacementConstraintSet {
    SXCRange<Uid> assets;
    SXCRange<PlacementOp> instructions; };
struct IPlacementSolver {
    virtual bool SX_CALL TrySolvePlacement(const PlacementConstraintSet& constraintSet) = 0 };
extern Uid c_posedHumanAsset;
extern Uid c_cokeCanAsset;
```

```
void Examples(IPlacementSolver& solver) {
  PlacementConstraintSet constraintSet;
  Uid assets[] = {c_posedHumanAsset, c_cokeCanAsset};
  constraintSet.assets = SXMakeRange(assets);
  auto humanInstance = 0u;
  std::vector<PlacementOp> operations;
  // Get point on floor, make sure it's facing up.
  // Decl what we're gonna place.
  operations.emplace_back(AnchorQueryLabel("instance:0",
AnchorQueryShapeType::OriginPoint, 0.f));
    auto humanOrigin = static_cast<uint>(operations.size());
    operations.emplace_back(AnchorQueryLabel("instance:0",
AnchorQueryShapeType::BoundingBox, 0.f));
    auto humanBoundingBox = static_cast<uint>(operations.size());
    operations.emplace_back(AnchorQueryLabel("instance:1",
AnchorQueryShapeType::OriginPoint, 0.f));
    auto cokeOrigin = static_cast<uint>(operations.size());
  // Constrain the human's origin (which's at bottom of it's feet) to be on the floor.
  { operations.emplace_back(AnchorQueryLabel("Floor",
AnchorQueryShapeType::Mesh, 0.f));
      auto floorAnyDirAnchor = static_cast<uint>(operations.size());
      operations.emplace_back(ConstrainDirection(floorAnyDirAnchor, Cone({0.f, -1.f,
0.f}, 0.f)));
      auto floorAnchor = static_cast<uint>(operations.size());
      operations.emplace_back(ConstrainDistance(humanOrigin, floorAnchor, 0.f, 0.f)); }
  // Constrain the coke can's origin (which's at bottom-center of the can) to be on a
table top.
  { operations.emplace_back(AnchorQueryLabel("Table",
AnchorQueryShapeType::Mesh, 0.f));
      auto tableAnyDirAnchor = static_cast<uint>(operations.size());
      operations.emplace_back(ConstrainDirection(tableAnyDirAnchor, Cone({0.f, -1.f,
0.f}, 0.f)));
      auto tableTopAnchor = static_cast<uint>(operations.size());
      // Put a coke can on the table top
      operations.emplace_back(ConstrainDistance(cokeOrigin, tableTopAnchor, 0.f, 0.f));
}
  // Ensure human is 50cm to 2m from the coke can
  { operations.emplace_back(ConstrainDistance(humanBoundingBox, cokeOrigin, 50.f,
200.f)); }
```

```
// Ensure human head is facing coke can within 40 degrees
{ // Get head joint
    operations.emplace_back(AnchorQueryJoint(humanInstance, "head", 0.f));
    auto headJointAnchor = static_cast<uint>(operations.size());
    // Get difference in angle between where head is facing and direction from head to coke
    operations.emplace_back(AnchorSubtract(cokeOrigin, headJointAnchor, 0.f,
AnchorSubtractBehavior::DirectionIsPositionDifference));
    auto headToCokeAnchor = static_cast<uint>(operations.size());
    operations.emplace_back(AnchorSubtract(headToCokeAnchor, headJointAnchor,
0.f, AnchorSubtractBehavior::DirectionIsDirectionDifference));
    auto headFacingCokeDiff = static_cast<uint>(operations.size());
    // Head facing angle is at least 40 degrees from facing Coke.
    operations.emplace_back(ConstrainDirection(headFacingCokeDiff, Cone{{0.f, 0.f,
1.f}, 40.f})); }
    constraintSet.operations = SXMakeRange(operations);
    // Will attempt to put the placed human in the scene following given constraints.
    solver.TrySolvePlacement(constraintSet); };
```

FIG. 7D

PLACING AND SOLVING CONSTRAINTS ON A 3D ENVIRONMENT

BACKGROUND

Computer vision researchers, artificial intelligence (AI) algorithm developers, hardware designers, and other consumers of three dimensional (3D) experiences often need to articulate objects within 3D environments, such as virtual worlds and mixed reality (MR) scenes. For example, computer vision researchers may need to place calibration targets on the walls of 3D buildings, or a game designer may need to place objects within the game's virtual world. Researchers developing autonomous vehicle sensors and algorithms, who are using a synthetics service for experiment generation, may need to place obstacles or create other tests for the systems being developed.

Unfortunately, placement in synthetic environments (such as virtual worlds, MR scenes, and other 3D environments containing synthetic data) typically requires specifying locations in coordinates, and the placement of an object must not interfere with other elements of the environment, such as a table should not be placed in a room such that it is partially passing through a wall. Ensuring proper placement of objects is thus often a time-consuming manual effort, with challenges for both scaling and level of difficulty. A human selecting locations by hand and verifying that the selected locations are compatible with the object placements, does not scale well when perhaps millions of objects (or viewing locations) must be placed and oriented. Writing programming code to place objects or specify viewing requires specialized skills.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Systems and methods are disclosed for permitting the use of a natural language expression to specify object locations in a three-dimensional (3D) environment. By rapidly identifying and solving constraints for 3D object placement and orientation, consumers of 3D mixed world or virtual world experiences may more efficiently generate experiments for use in development of artificial intelligence (AI) algorithms and sensor platforms, or interact at scale with 3D environments. Parsing descriptive location specifications, sampling the volumetric space, and solving pose constraints for location and orientation, may produce large numbers of designated coordinates for object locations in virtual environments with reduced demands on user involvement. Converting from location designations that are natural to humans, such as "standing on the floor one meter from a wall, facing the center of the room" to a six-dimensional (6D) pose specification (including 3D location and orientation) can alleviate the need for a manual drag/drop/reorient procedure for placement of objects in a synthetic environment, or manual marking of digital overlays of real-world or synthetic worlds.

Some aspects and examples disclosed herein are directed to a system for placing and solving constraints on a 3D environment, comprising: a parser for isolating input placement constraints into translational constraints and rotational constraints; a spatial environment interface; a translational constraint interpreter (TCI), in communication with the spatial environment interface, for determining and sampling available volumetric space in a synthetic environment to determine a set of points, in accordance with the translational constraints; and a rotational constraint interpreter (RCI), in communication with the spatial environment interface, for determining a set of poses that satisfy the rotational constraints, from the set of points, for assets to be inserted into the synthetic environment.

Additional aspects and examples disclosed herein are directed to a method for placing and solving constraints on a 3D environment, comprising: receiving placement constraints; parsing the obtained constraints to isolate translational constraints and rotational constraints; determining and sampling available volumetric space in a synthetic environment to determine a set of points, in accordance with the translational constraints; and determining a set of poses that satisfy the rotational constraints, from the set of points, for assets to be inserted into the synthetic environment.

Additional aspects and examples disclosed herein are directed to one or more computer storage devices having computer-executable instructions stored thereon for placing and solving constraints on a 3D environment, which, on execution by a computer, cause the computer to perform operations, the instructions comprising: a parser component for isolating input placement constraints into translational constraints and rotational constraints; a spatial environment interface component; a translational constraint interpreter (TCI) component, in communication with the spatial environment interface component, for determining and sampling available volumetric space in a synthetic environment to determine a set of points, in accordance with the translational constraints; and a rotational constraint interpreter (RCI) component, in communication with the spatial environment interface component, for determining a set of poses that satisfy the rotational constraints, from the set of points, for assets to be inserted into the synthetic environment.

Alternatively or in addition to the other examples described herein, some examples include any combination of the following: the translational constraints comprise a distance from a reference; the translational constraints comprise a spatial relationship relative to a reference; the translational constraints comprise an implicit constraint preventing two objects conflicting for a common volume; the rotational constraints comprise at least one selected from the list consisting of: direction and facing a reference; a converter for converting input into a spatial query to solve, wherein the parser isolates translational constraints and rotational constraints from the spatial query; and input is obtained through at least one selected from the list consisting of: text, speech, and an application programming interface (API).

BRIEF DESCRIPTION OF THE DRAWINGS

The disclosed examples are described in detail below with reference to the accompanying drawing figures listed below:

FIG. 6 is another block diagram of a process flow for placing and solving constraints on a synthetic 3D environment;

FIGS. 7A-7D illustrate various pseudo-code implementations for performing some of the operations disclosed herein;

Corresponding reference characters indicate corresponding parts throughout the drawings.

DETAILED DESCRIPTION

Figure 1:
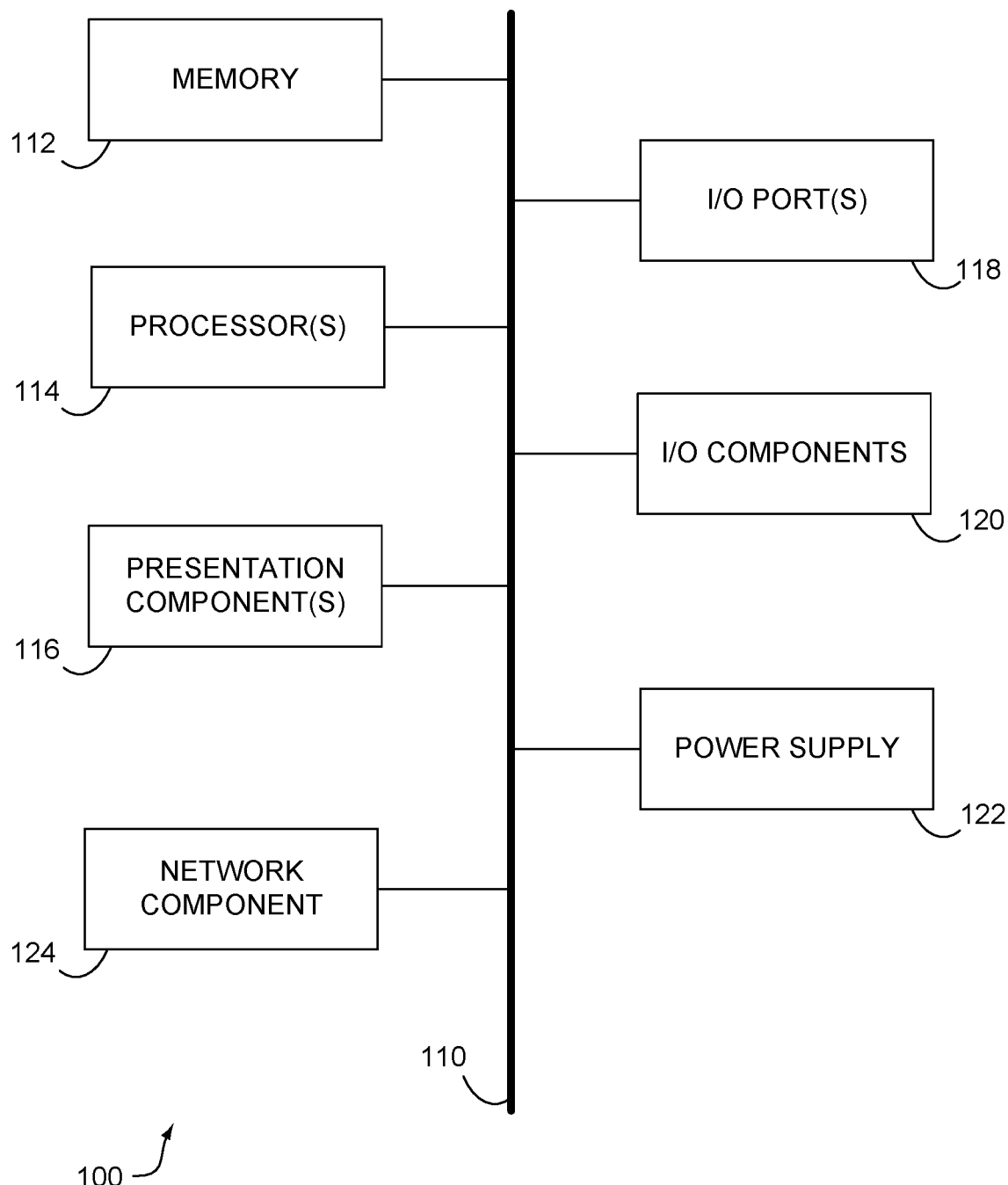
FIG. 1 is a block diagram of an example computing environment suitable for implementing some of the various examples disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Computer vision researchers, artificial intelligence (AI) algorithm developers, hardware designers, and other consumers of three-dimensional (3D) experiences often need to articulate objects within virtual environments. A virtual environment may include virtual worlds or mixed reality (MR) that produce virtual scenes. A synthetic 3D environment service may be used for generating synthetic data, perhaps to efficiently train AI algorithms in navigation, localization, and/or object detection and recognition. For example, computer vision researchers may need to place calibration targets on the walls of 3D buildings, or a game designer may need to place objects within the game's virtual world. Researchers developing autonomous vehicle sensors and algorithms, who are using a synthetics service for experiment generation, may need to place obstacles or create other tests for the systems being developed. For example, in a virtual experiment in which an autonomous vehicle is to be driven through a synthetic city environment to test sensor configurations and algorithms, large numbers of object poses must be specified. Poses include 3D location and 3D orientation (rotations), giving six degrees (6D) of freedom.

Placement in synthetic environments, or virtual worlds has typically required specifying locations in coordinates and ensuring that the placement of an object does not interfere with other elements of the environment. For example, a table should not be placed in a room such that it is partially passing through a wall. A content editor may have been previously used, such as Blender® or Studio Max' with a mouse to navigate the 3D environment, and manually pinpoint spaces, or perhaps an API was used with some custom-written code. Ensuring proper placement of objects is thus often a time-consuming manual effort, with challenges for both scaling and level of difficulty. A human selecting locations by hand and verifying that the selected locations are compatible with the object placements, does not scale well when perhaps millions of objects (or viewing locations) must be placed and oriented. Writing programming code to place objects or specify viewing requires specialized skills. For some applications, it may require hours to or days to set poses for large numbers of objects.

Whereas the designation of pose information requires coordinate designations, humans tend to think of locations in more relative terms, such as "near a wall" or "on a table" or some other similar specification. Thus, users of 3D virtual worlds with mixed reality (MR) may prefer to use a natural language descriptive way to position objects (assets), rather than using a labor-intensive procedure of manual drag, drop, and then reorient the objects. Aspects of the disclosure provide for novice users to rapidly place large numbers of objects, without requiring a high degree of expertise.

Systems and methods are disclosed for permitting the use of a natural language expression to specify object locations in a virtual three-dimensional (3D) environment. By rapidly identifying and solving constraints for 3D object placement and orientation, consumers of synthetics services may more efficiently generate experiments for use in development of artificial intelligence (AI) algorithms and sensor platforms. Parsing descriptive location specifications, sampling the volumetric space, and solving pose constraints for location and orientation, can produce large numbers of designated coordinates for object locations in virtual environments with reduced demands on user involvement and/or expertise. Converting from location designations that are natural to humans, such as "standing on the floor one meter from a wall, facing the center of the room" to a six-dimensional (6D) pose specification (including 3D location and orientation) can alleviate the need for a manual drag/drop/reorient procedure for placement of objects in a synthetic environment.

Physics engines such as Bullet, PhysX® by NVIDIA®, or Havok® may be used directly or indirectly through tools such as Maya®, 3DMax®, or game engines such as Unity® and Unreal®. A physics engine may assist in placing objects without intersecting other objects in the 3D virtual world, such as preventing a table from being placed such that it partially passes through a wall. For example, a placement description may be created in natural language that uses descriptive constraints, such as "on a wall" or "50 cm from a floor" and a constraint solver finds a placement that both meets the constraints and physics engine requirements. Some constraints may be specified in terms of distance and rotation relative to other objects. The constraint that two objects cannot simultaneously occupy the same volume may be enforced by a physics engine. Thus, a solution is provided that uses a constraint solver with a 3D environment to identify a discrete set of positions and rotations (poses) where 3D objects can be placed in the environment meeting user-defined constraints.

FIG. 1 is a block diagram of an example computing device 100 for implementing aspects disclosed herein and is designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 2 described in more detail below, where tasks are performed by remote-processing devices that are linked through a communications network.

Computing device 100 includes a bus 110 that directly or indirectly couples the following devices: memory 112, one or more processors 114, one or more presentation components 116, input/output (I/O) ports 118, I/O components 120, a power supply 122, and a network component 124. Computing device 100 should not be interpreted as having any dependency or requirement related to any single component or combination of components illustrated therein. While computing device 100 is depicted as a seemingly single device, multiple computing devices 100 may work together and share the depicted device resources. For instance, memory 112 may be distributed across multiple devices, processor(s) 114 may provide housed on different devices, and so on.

Bus 110 represents what may be one or more busses (such as an address bus, data bus, or a combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and the references herein to a "computing device."

Memory 112 may include any of the computer-readable media discussed below with reference to an "Example Operating Environment." Memory 112 may be used to store and access instructions configured to carry out the various operations disclosed herein. In some examples, memory 112 includes computer-storage media in the form of volatile and/or nonvolatile memory, removable or non-removable memory, data disks in virtual environments, or a combination thereof.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor, by multiple processors within the computing device 100, or by a processor external to the client computing device 100. In some examples, the processor(s) 114 are programmed to execute instructions such as those illustrated in the flowcharts discussed below and depicted in the accompanying drawings. Moreover, in some examples, the processor(s) 114 represent an implementation of analog techniques to perform the operations described herein. For example, the operations may be performed by an analog client computing device 100 and/or a digital client computing device 100.

Presentation component(s) 116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways.

Ports 118 allow computing device 100 to be logically coupled to other devices including I/O components 120, some of which may be built in. Examples I/O components 120 include, for example but without limitation, a microphone, keyboard, mouse, joystick, game pad, satellite dish, scanner, printer, wireless device, etc.

In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, the network component 124 is operable to communicate data over public, private, or hybrid (public and private) using a transfer protocol, between devices wirelessly using short range communication technologies (e.g., near-field communication (NFC), BLUETOOTH® branded communications, or the like), or a combination thereof.

Figure 2:
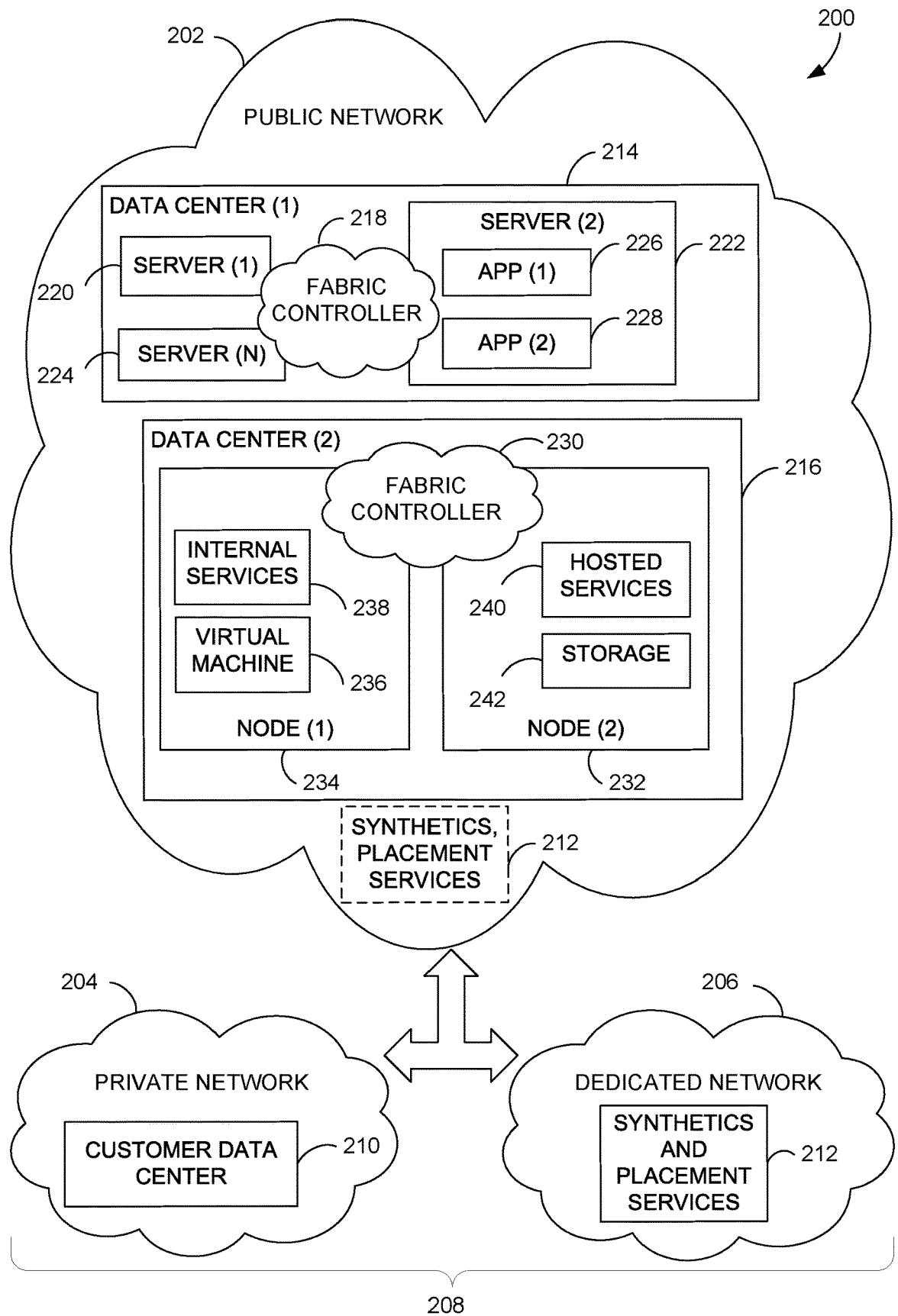
FIG. 2 is a block diagram of an example cloud-computing infrastructure suitable for a service implementing some of the various examples disclosed herein.

Turning now to FIG. 2, an exemplary block diagram illustrates a cloud-computing environment for placing and solving constraints on a 3D environment. Architecture 200 illustrates an exemplary cloud-computing infrastructure, suitable for use in implementing aspects of this disclosure. Architecture 200 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 2 includes a public network 202, a private network 204, and a dedicated network 206. Public network 202 may be a public cloud-based network of computing resources, for example. Private network 204 may be a private enterprise network or private cloud-based network of computing resources. And dedicated network 206 may be a third-party network or dedicated cloud-based network of computing resources. In some examples, private network 204 may host a customer data center 210, and dedicated network 206 may host cloud synthetics and placement services 212. Some embodiments of synthetics and placement services 212 may provide synthetic 3D environments as well as placing and solving constraints on a 3D environment.

Hybrid cloud 208 may include any combination of public network 202, private network 204, and dedicated network 206. For example, dedicated network 206 may be optional, with hybrid cloud 208 comprised of public network 202 and private network 204. Along these lines, some customers may opt to only host a portion of their customer data center 210 in the public network 202 and/or dedicated network 206, retaining some of the customers' data or hosting of customer services in the private network 204. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). A myriad of other scenarios exist whereby customers may desire or need to keep certain portions of data centers under the customers' own management. Thus, in some examples, customer data centers may use a hybrid cloud 208 in which some data storage and processing is performed in the public network 202 while other data storage and processing is performed in the dedicated network 206.

Public network 202 may include data centers configured to host and support operations, including tasks of a distributed application, according to the fabric controller 218. It will be understood and appreciated that data center 214 and data center 216 shown in FIG. 2 are merely examples of suitable implementations for accommodating one or more distributed applications and are not intended to suggest any limitation as to the scope of use or functionality of examples disclosed herein. Neither should data center 214 and data center 216 be interpreted as having any dependency or requirement related to any single resource, combination of resources, combination of servers (e.g., servers 220 and 224) combination of nodes (e.g., nodes 232 and 234), or a set of application programming interfaces (APIs) to access the resources, servers, and/or nodes.

Data center 214 illustrates a data center comprising a plurality of servers, such as servers 220 and 224. A fabric controller 218 is responsible for automatically managing the servers 220 and 224 and distributing tasks and other resources within the data center 214. By way of example, the fabric controller 218 may rely on a service model (e.g., designed by a customer that owns the distributed application) to provide guidance on how, where, and when to configure server 222 and how, where, and when to place application 226 and application 228 thereon. One or more role instances of a distributed application may be placed on one or more of the servers 220 and 224 of data center 214, where the one or more role instances may represent the portions of software, component programs, or instances of roles that participate in the distributed application. In other examples, one or more of the role instances may represent stored data that are accessible to the distributed application.

Data center 216 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative embodiments of the disclosure. Generally, virtual machine 236 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of data center 216 and for placing the role instances and other resources (e.g., software components) within the data center 216. By way of example, the fabric controller 230 may rely on a service model (e.g., designed by a customer that owns the service application) to provide guidance on how, where, and when to configure the virtual machines, such as virtual machine 236, and how, where, and when to place the role instances thereon.

As discussed above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, a server, the computing device 100 of FIG. 1, and the like. In one instance, the nodes 232 and 234 host and support the operations of the virtual machine(s) 236, while simultaneously hosting other virtual machines carved out for supporting other tenants of the data center 216, such as internal services 238 and hosted services 240. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 202. The network cloud serves to interconnect resources, such as the role instances, which may be distributed across various physical hosts, such as nodes 232 and 234. In addition, the network cloud facilitates communication over channels connecting the role instances of the service applications running in the data center 216. By way of example, the network cloud may include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Figure 3:
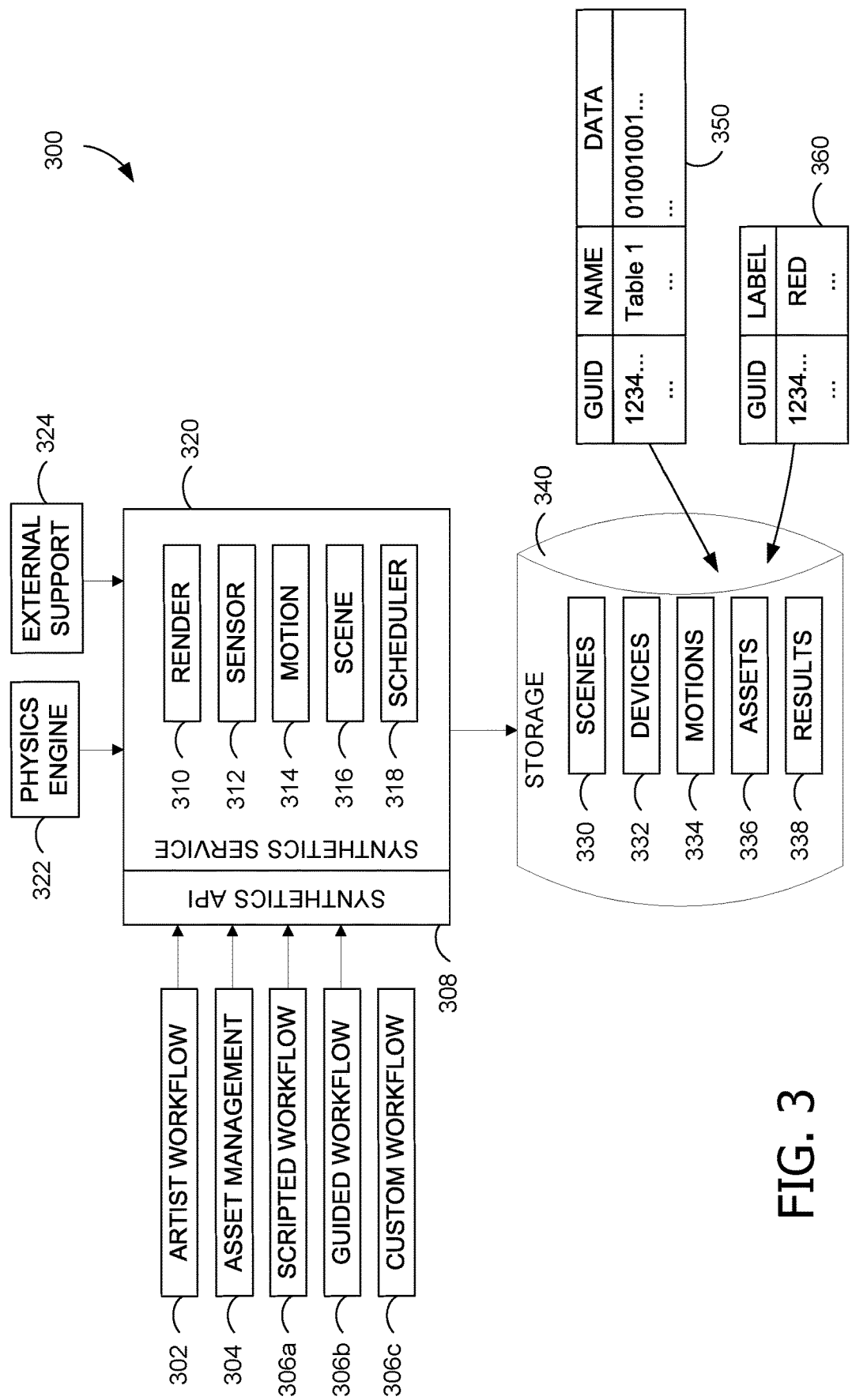
FIG. 3 is an illustration of an architecture for creating synthetic imagery, according to some of the various examples disclosed herein.

FIG. 3 is an illustration of an architecture 300 for creating synthetic imagery, which may be used with some of the various examples disclosed herein. In architecture 300, several inputs, including an artist workflow 302, an asset management 304, and other workflows (a scripted workflow 306*a*, a guided workflow 306*b*, and a custom workflow 306*c*) interface via a synthetics API 308 to a synthetics service 320. Synthetics service 320 may have multiple components or modules, including a renderer 310, a sensor modeler 312, a motion module 314, a scene generation module 316, and a scheduler 318. External functionality is illustrated as a physics engine service 322 and other external support 324, which may include off-loaded rendering computations. It should be understood that different functionalities may be internal or external services, and that FIG. 3 is only used for illustrative purposes. Together, the various functionality is able to intake virtual objects (assets), lighting models, orchestrated motion, camera and other sensor positions, to render synthetic (virtual) environment imagery.

The generated synthetic imagery, environment (scene) data and other associated data may then be archived in a storage medium 340 for use in the described virtual experimentation. As illustrated, various data sets are stored, including the scene data 330, device data 332, motion data 334, asset data 336, and results 338. As illustrated several data fields are associated with the stored assets. Data structure 350 indicates that a globally unique identifier (GUID), which may be a 32-digit hexadecimal value in some examples, is used to index an asset named "Table 1" and described by the specific model given by the binary sequence in the data column. Additionally, a label has been created for Table 1, referenced by the same GUID, as shown in a data structure 360. The label is rendered as BLACK, indicating that, in training image data (such as data sets used for neural network training), pixels corresponding to Table 1 are to be colored red.

Figure 4A:
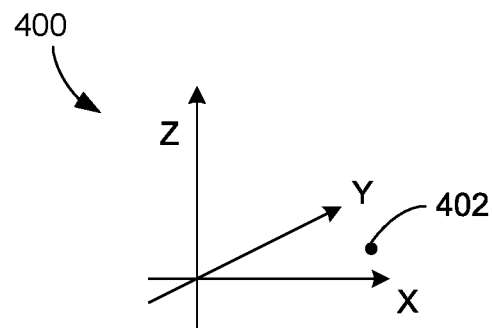
FIGS. 4A-4C illustrate various coordinate system parameters.
Figure 4B:
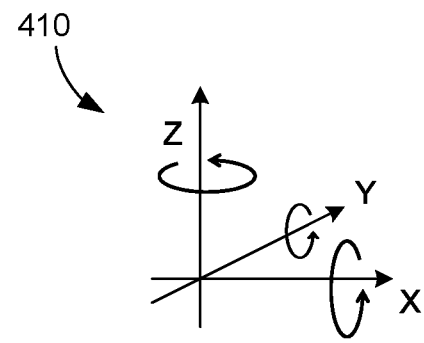
Figure 4C:
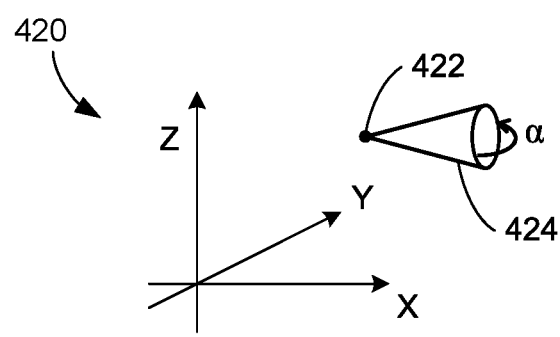

FIGS. 4A-4C illustrate various coordinate system parameters. Coordinate system 400 of FIG. 4A is a 3D Cartesian system, with x, y, and z axes. A point 402 is indicated as a particular location, designated by specific coordinate values. Coordinate system 410 of FIG. 4B illustrates rotational vectors about each of the x, y, and z axes. A pose is a combination of a translational component (particular coordinate values specifying a location), and a rotational component, specified by rotation about each of the axes. Thus, a pose is a 6D specification: translational 3D and rotational 3D. For example, a pose may be expressed as {Xt, Yt, Zt, Xr, Yr, Zr}, where Xt, Yt, and Zt are the translational components, relative to the x, y, and z axes (see FIG. 4A), respectively, and Xr, Yr, and Zr are the rotational components (see FIG. 4B), relative to the x, y, and z axes, respectively. In a captured motion scenario, for example, poses may be recorded on some specified time interval (such as every 200 milliseconds (ms). If the motion is to be reproduced at a later time, positions between the captured poses may then be interpolated.

FIG. 4C illustrates a coordinate system 420 having an anchor 422 and a cone 424. An anchor may be a pose, with both translational and rotational components, or may just be a point, such as point 402 (for FIG. 4A) without a rotational (or directional) component. A cone expresses a range of possible pose pointing directions and may be specified using a unit pointing vector and an opening angle, such as with {Xu, Yu, Zu, a}, where Xu, Yu, and Zu are unit vector components in the x, y, and z axis directions, respectively, and a is the opening angle of the cone. A cone may be considered as indicating an infinite set of anchors, with rotational components pointing in all possible directions within the cone boundaries. With a sufficient opening angle, a cone may point in all possible directions. In some embodiments, cones may be elliptical (rather than circular), with different azimuth and elevation opening angles. In general, anchors specify a point in an environment, possibly with a pointing direction, and if so, then an associated cone defines the range of possible variation of the pointing direction.

Figure 4D:
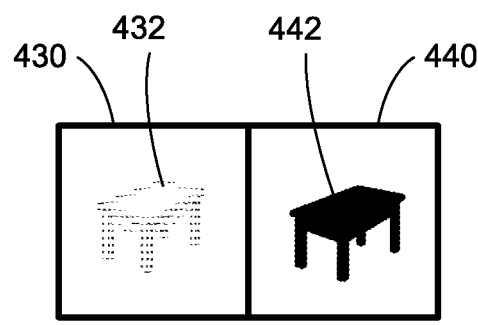
FIG. 4D illustrates labeling of an object.

FIG. 4D illustrates labeling of an object according to the label data structure 360 (of FIG. 3). Image 430 contains a rendering 432 of Table 1, and thus in a corresponding ground truth (GT) image 440, the set of pixels 442 corresponding to Table 1 are uniformly colored. The coloring is illustrated as black, however, in an implemented embodiment capable of expressing colors, the pixels may instead be red, according to label data structure 360. In general, a synthetic environment may be comprised of assets that are labeled by type. For some embodiments, customers may supply their own labeling schemes, due to the details and specificity required. Labeling may be used in supervised learning for some neural networks. A neural network may intake image 430 and learn that set of pixels 442 correspond to Table 1, from GT image 440.

Figure 5:
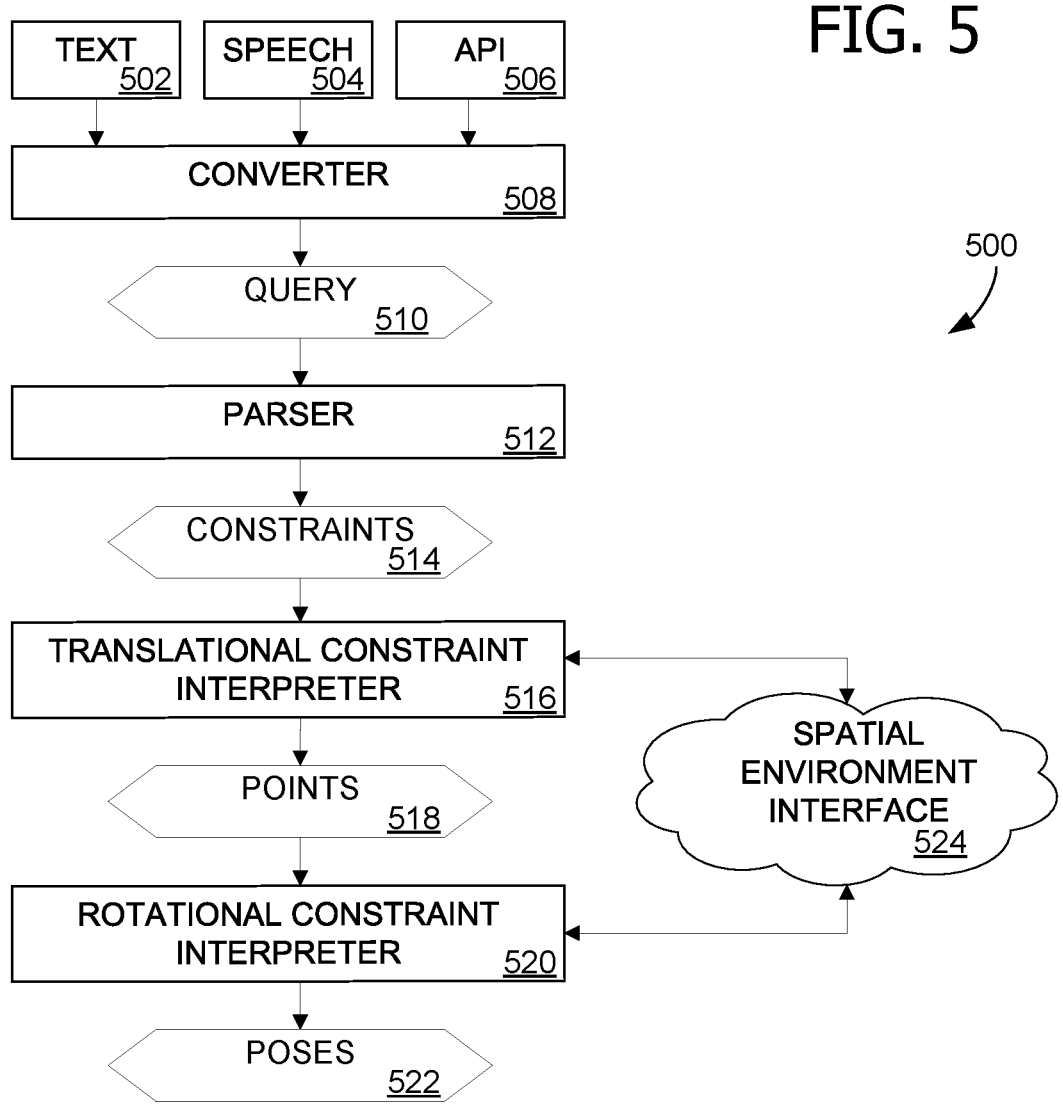
FIG. 5 is a block diagram of a process flow for placing and solving constraints on a synthetic 3D environment.

FIG. 5 is a block diagram of a process flow 500 for placing assets and solving constraints on a 3D environment. In an exemplary operation, a user may be training some AI, such as a neural network for object detection and recognition. The user may virtually place a synthetic camera in a 3D environment such that is captures an image of a table, perhaps to generate an image similar to image 430 (of FIG. 4D). A suitable anchor point will be needed for placing and orienting the synthetic camera asset. Process flow 500 provides a spatial query functionality that can return suitable anchor point candidates.

In FIG. 5, three input paths are illustrated, a text input 502, a speech input 504, and an application program interface (API) 506, although it should be understood that additional inputs may be provided, or some omitted in various embodiments. A converter 508 obtains input placement constraints and converts them into a query data structure 510 having a spatial query to solve. Speech and text recognition functionality, including processing of natural language to parse key words, may be provided in some embodiments. Inputs obtained through an API 506 may require less conversion than natural speech or text expression. Query data structure 510 may be an expressed function and object chain, which is input into a parser 512. Using data in the spatial query, parser 512 isolates translational constraints, rotational constraints, and the number of items requested to determine a constraints data structure 514 that may be compatible with an API for a constraint solver and placement service. Parser 512 may also provide default constraints, such as that some assets may not simultaneously occupy the same volume. Default constraints may supplement user-specified constraints or be used when there are no user-specified constraints.

Examples of spatial and directional relations for user-specified constraints, within constraints data structure 514, may include: Higher than . . . ; No higher than . . . ; Lower than . . . ; No lower than . . . ; Near . . . ; Around . . . ; Away from . . . ; Towards . . . ; Over . . . ; Under . . . ; Above . . . ; Looking up . . . ; Looking down . . . ; Looking towards . . . ; etc. Boolean logic may be used for combining constraints, such as {(In Kitchen) AND (Looking towards GUID 1234)} or {(On Wall) AND (Above Floor, 2 meters)}. This scheme permits users to express intentions for discrete poses without having to know the exact coordinates in the synthetic environment. Examples of natural language constraint specification obtained by converter 508 may include "Please find me 10 places on walls about 4 meters above the ground," and "Find 1,000 places greater than 1 foot from wall and 3.2 meters above floor, looking down with a 5-15-degree tilt."

Constraints may be of different types, such as Distance, Direction, Facing, Implicit, for example. A Distance constraint uses anchor points for measuring separation, such as asset A must be some distance, D, from a reference, such as the location of particular type of asset B. In addition to mere separation, relative position may be specified, using above, below, in front of, or others. Thus, a translational constraint may include a spatial relationship relative to a reference. To support this, distances may be measured in the pointing direction, if relevant, and the output of a Distance constraint may be another anchor point that may not have a direction (initially). A Direction constraint may generate or use a cone with a pose. A Facing constraint may be similar to a Direction constraint, but specified relative to a reference, such as another asset or object, and may also have a tolerance angle specified. Implicit constraint may include a translational constraint that multiple objects do not conflict for a particular common volume (such as a table passing partially through a wall). Implicit constraints may include distribution, such as random or uniformly, if not specified by the user. Translational and rotational constraints may be inclusive of distribution or arrangement constraints, such as: " . . . in the middle of . . . " used in "1 pose in the middle of a wall", and " . . . uniformly . . . " used in "100 uniformly selected poses 2-3 feet above tables."

Anchor queries find anchors in an environment. These may include (1) Anchor on an asset A; where A is an object label, the direction is the normal of the surface; and can be on bounding box; and (2) Anchor from joint J on asset A, where A is an asset being placed in an environment. Examples may include that an object is on a surface of a table (the anchor is on the table), or a range of distances, such as 50 to 200 centimeters distance. Specifying that an avatar of a person is 0 cm from a floor constrains the avatar to be on the floor, perhaps standing up. Similar constraints may "hang" pictures on a wall or affix lights to a ceiling.

Constraints 514 are passed to a translational constraint interpreter (TCI) 516. TCI 516 intakes a set of structured statements and will determine available volumetric space for the total supported environment, and then will query a spatial environment interface 524 as it iterates through a list of translational constraints (as isolated by parser 512). Spatial environment interface 524 may be implemented by synthetics and placement services 212 (of FIG. 2). This operation may reduce the total available space accordingly, using a constraint solver. The output of this spatial carving process is a sub-volume that is determined to have satisfied the translational constraints. Next, TCI 516 will sample this determined sub-volume to determine a set of points 518, which are passed to a rotational constraint interpreter (RCI) 520 for determining a further subset of points that also satisfy the rotational constraints (as isolated by parser 512).

RCI 520 will iterate through the rotational constraints and points 518, querying spatial environment interface 524, select rotations, and translate them into poses 522 for return to the user. Spatial environment interface 524 has at least two functional sets of queries that enable accessing necessary geometric information regarding translational constraints and rotational constraints. In some embodiments, the interface includes capabilities such as retrieving total volumetric space, retrieving volumetric space of a discrete object by GUID, retrieving GUIDs of objects of a specific type, and retrieving GUIDs of objects nearest a specified asset. The interaction between TCI 516 and spatial environment interface 524 solves translational constraints using both user-specified constraints and those enforced by a physics engine, while the interaction between RCI 520 and spatial environment interface 524 solves rotational constraints.

Thus, TCI 516, in communication with spatial environment interface 524, determines and samples available volumetric space in a synthetic environment to determine set of points 518, in accordance with the translational constraints isolated by parser 512. Then, RCI 520, in communication with spatial environment interface 524, determines a subset of points 518 that satisfy the rotational constraints isolated by parser 512 to determine set of poses 522 for assets to be inserted into the synthetic environment. The combination is a pose constraint solver. Spatial environment interface 524 has multiple capabilities, such as retrieving the total volumetric space; retrieving the volumetric space of a discrete object by GUID; retrieving GUIDs of objects of a specific type; and retrieving GUIDs of objects nearest to a specified object.

FIG. 6 is another block diagram of a process flow 600 for placing assets and solving constraints on a 3D environment. FIG. 6 may be viewed along with FIG. 5, specifically TCI 516, points 518, RCI 520, poses 522, and spatial environment interface 524. A first call to spatial environment interface 524 may be to retrieve an environment 602. Environment 602 may represent a virtual environment as large as a city, measured perhaps in miles, or may be significantly smaller, such as a single room, in some examples. If environment 602 is not fully labeled, then spatial environment interface 524 facilitates a labeling operation 604. Each object may be assigned a label, such as "Table" or "Chair 1" or "Wall". Labels are used in constraints, such as "Place a Camera Above a Table" or "Place a Human Facing a Chair, Within 45 degrees." Spatial environment interface 524 may also provide a library of objects for use in finishing or building environment 602. Environment 602 is then comprised of objects that are labeled according to type and saved as a labeled environment 606.

As an exemplary scenario, consider that a user wishes to create a synthetic environment to test an autonomous vehicle, and is therefore placing pedestrians on sidewalks in a portion of environment 606. Operation 610 identifies available volumetric space 612, meeting some constraint, such as {On a Sidewalk}. This may be accomplished by an interaction between TCI 516 and spatial environment interface 524. Next, space 612 is sampled, perhaps randomly or according to some specified scheme, to determine sample points 616, in operation 614. In some embodiments, operation 614 may be performed by TCI 516. In operation 618, TCI 516 further references translational constraints and leverages a physics engine in spatial environment interface 524 (such as perhaps physics engine 322 of FIG. 3) to select the subset of points 620 that satisfy the translational constraints. In operation 622, RCI 520 interfaces with spatial environment interface 524 to identify which of points 620 may also be able to satisfy the rotational constraints, thereby producing a set of poses 624.

FIGS. 7A-7D together illustrate various pseudo-code implementations for performing some of the operations disclosed herein. FIG. 7A illustrates pseudo-code related to structure definitions of cones and anchors (see FIG. 4C), along with placement operation definitions. FIG. 7B illustrates pseudo-code related to query and constraint operations; FIG. 7C illustrates pseudo-code related to placement and constraint operations; and FIG. 7D illustrates pseudo-code related to directional constraint operations. Together, FIGS. 7A-7C illustrate pseudo-code implementations that may be used in conjunction with the operations described in FIGS. 5, 6, and 8.

Figure 8:
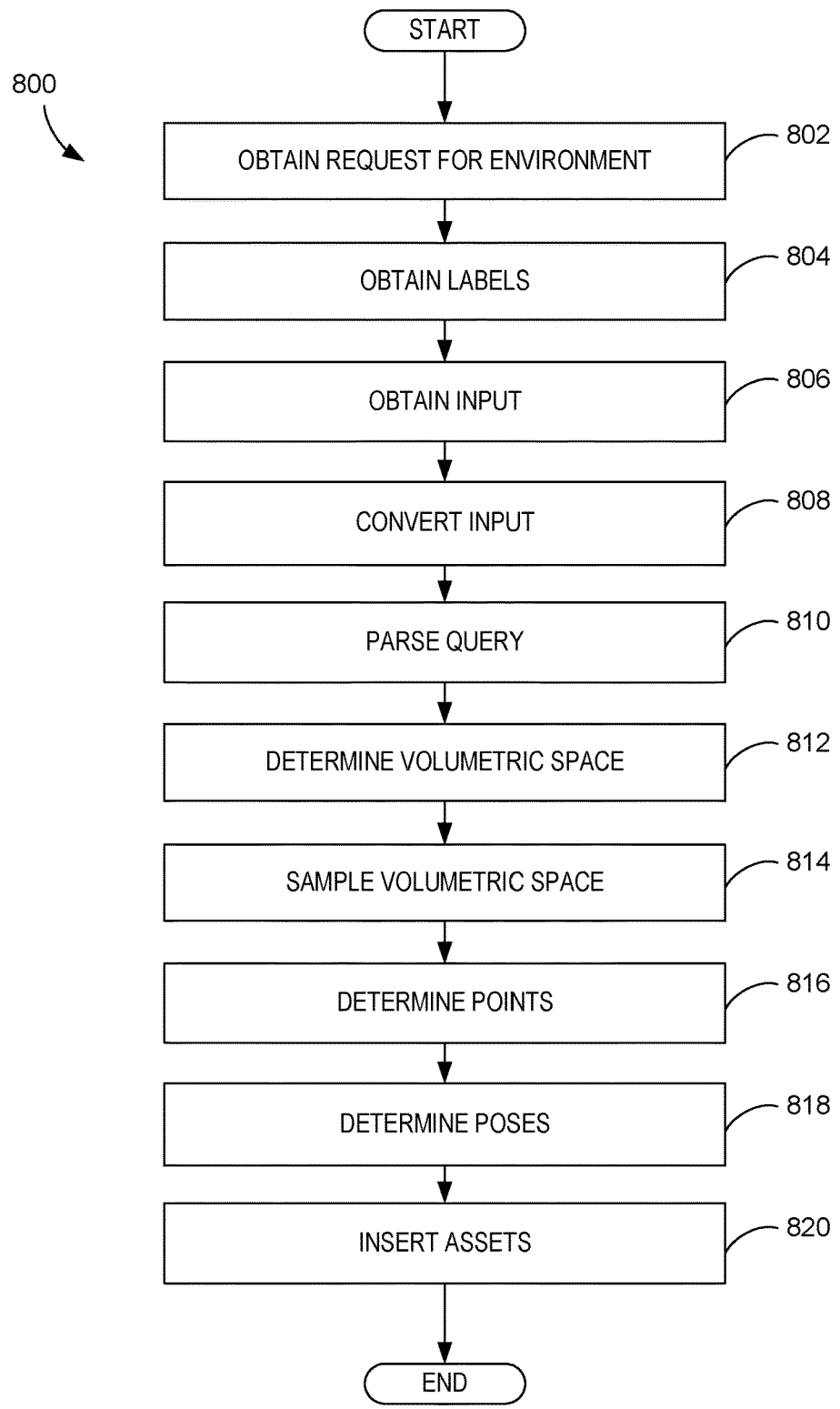
FIG. 8 is a flow chart illustrating an exemplary operation of placing and solving constraints on a synthetic 3D environment.

FIG. 8 is a flow chart 800 illustrating an exemplary operation of placing and solving constraints on a 3D environment, suitable for implementing some of the various examples disclosed herein. Process 800 may be implemented as a cloud service, in part or in whole, and may further be implemented on one or more computer storage devices having computer-executable instructions stored thereon for placing and solving constraints on a 3D environment. Process flows 500 and 600 (see FIGS. 5 and 6) may operate according to flow chart 800, possibly implemented by at least a portion of the pseudo-code illustrated in FIGS.

7A-7D. It should be understood that functionality may be allocated in some embodiments in a different order differently than is described in this exemplary embodiment.

Process 800 starts with receiving a request for an environment in operation 802. For example, a user may specify a synthetic environment (such as environment 602 of FIG. 6) on which to perform a spatial query. Labels for objects and assets are obtained in operation 802, possibly from a custom definition file provided by the user, and placement constraints are obtained as input for the spatial query in operation 806. Input may come through any of text, speech, and an API input. In operation 808, the obtained input is converted into a spatial query to solve. The query is parsed, in operation 810, to isolate translational constraints from rotational constraints. The available volumetric space in the synthetic environment or environment is determined in operation 812, and the available volumetric space is sampled in operation 814. The initial set of candidate points is determined in operation 816, from among the sampled space, according to the translational constraints. Translational constraints may comprise a distance from a reference, a spatial relationship relative to a reference, and/or an implicit constraint preventing two objects conflicting for a common volume. Using the initial set of points, rotational constraints are used to determine a set of poses, in operation 818. Assets or objects may be inserted or placed into the environment in operation 820.

Spatial reasoning uses total volume, translational constraints, and rotational constraints expressed in terms of object references, spatial relationships, and concepts of density and arrangement. The solver, implemented as described above, intakes constraints and outputs a solution: the set of poses 624 (see FIG. 6). The solver may operate on the constraints in order, and then join the output. That is, the solver may follow a work flow, such as:
1. Find all constraints that act on a specific instance X.
2. Take the first constraint.
3. Resolve any anchor queries that are part of constraint.
   a. Pick a random instance in the room that has label Y.
   b. Pick a random point on the surface of this instance, create an anchor from it.
4. Ensure the chosen anchor matches any direction constraints.
5. Pick a random offset
6. Go through all following constraints including implicit and ensure they are satisfied by P.
   a. For each instance in the environment matching label Y
   b. Check whether instance bounding box satisfies distance constraint for quick rejection.
7. If any are not satisfied throw away point, if they are store point.
8. GOTO 1.

Additional Examples

Some examples are directed to a system for placing and solving constraints on a 3D environment, comprising: a parser for isolating input placement constraints into translational constraints and rotational constraints; a spatial environment interface; a translational constraint interpreter (TCI), in communication with the spatial environment interface, for determining and sampling available volumetric space in a synthetic environment to determine a set of points, in accordance with the translational constraints; and a rotational constraint interpreter (RCI), in communication with the spatial environment interface, for determining a set of poses that satisfy the rotational constraints, from the set of points, for assets to be inserted into the synthetic environment.

Some examples are directed to a method for placing and solving constraints on a 3D environment, comprising: receiving placement constraints; parsing the obtained constraints to isolate translational constraints and rotational constraints; determining and sampling available volumetric space in a synthetic environment to solve for (determine) a set of points, in accordance with the translational constraints; and determining a set of poses that satisfy the rotational constraints, from the set of points, for assets to be inserted into the synthetic environment.

Some examples are directed to one or more computer storage devices having computer-executable instructions stored thereon for placing and solving constraints on a 3D environment, which, on execution by a computer, cause the computer to perform operations, the instructions comprising: a parser component for isolating input placement constraints into translational constraints and rotational constraints; a spatial environment interface component; a translational constraint interpreter (TCI) component, in communication with the spatial environment interface component, for determining and sampling available volumetric space in a synthetic environment to determine (solve for) a set of points, in accordance with the translational constraints; a rotational constraint interpreter (RCI), in communication with the spatial environment interface, for determining a set of poses that satisfy the rotational constraints, from the set of points, for assets to be inserted into the synthetic environment.

Alternatively or in addition to the other examples described herein, some examples include any combination of the following: the translational constraints comprise a distance from a reference; the translational constraints comprise a spatial relationship relative to a reference; the translational constraints comprise an implicit constraint preventing two objects conflicting for a common volume; the rotational constraints comprise at least one selected from the list consisting of: direction and facing a reference; a converter for converting input into a spatial query to solve, wherein the parser isolates translational constraints and rotational constraints from the spatial query; and input is obtained through at least one selected from the list consisting of: text, speech, and an application programming interface (API).

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
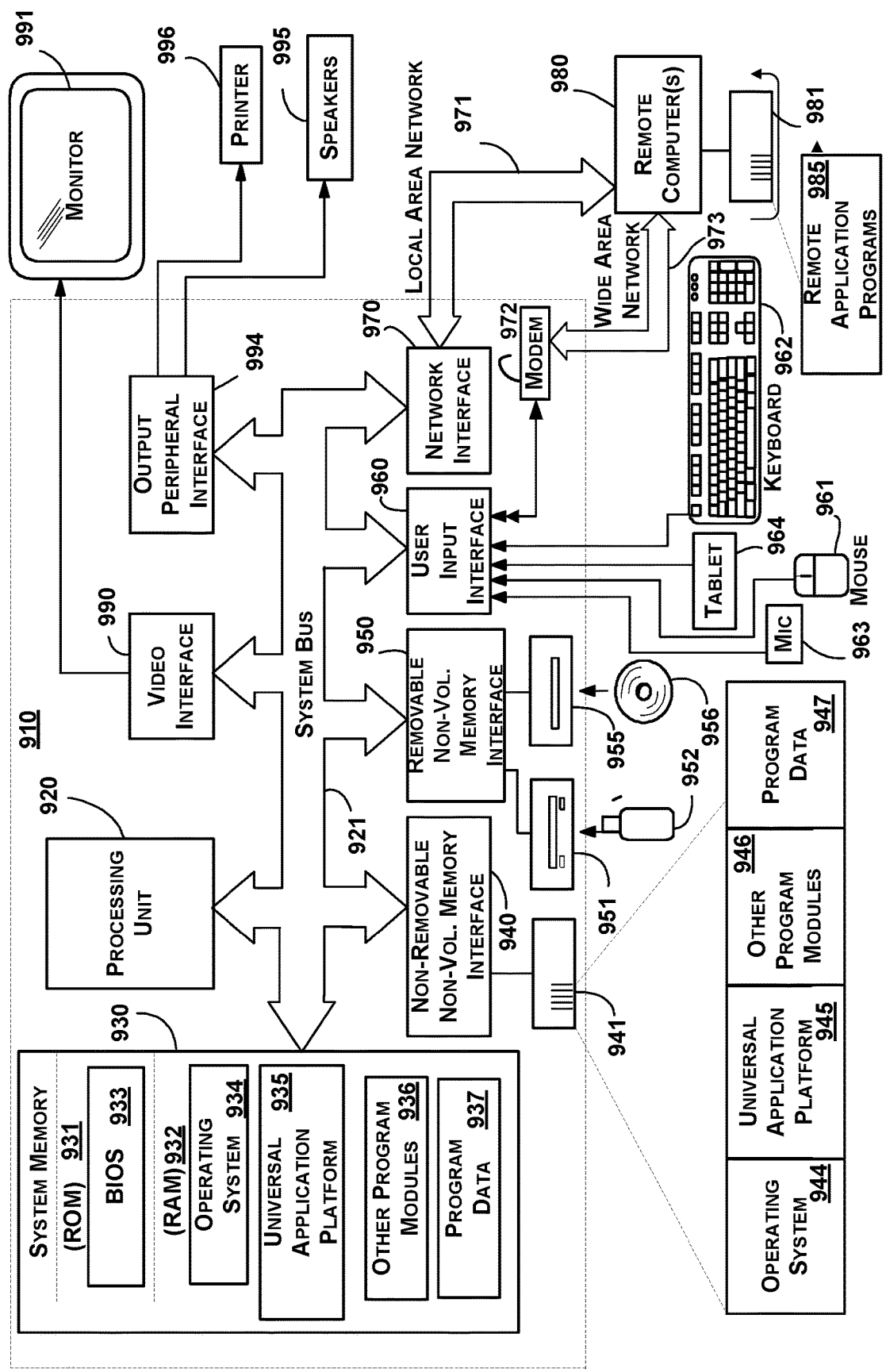
FIG. 9 is an exemplary block diagram illustrating an operating environment for a computing device suitable for implementing various aspects of the disclosure.

FIG. 9 illustrates an example of a suitable computing and networking environment 900 on which the examples of the disclosure may be implemented. The computing environment 900 is only one example of a suitable computing environment and is not intended to suggest any limitation as to the scope of use or functionality of the disclosure. Neither should the computing environment 900 be interpreted as having any dependency or requirement relating to any one or combination of components illustrated in the exemplary operating environment 900.

The disclosure is operational with numerous other general purpose or special purpose computing environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 9, an exemplary architecture for implementing various aspects of the disclosure may include a general-purpose computing device in the form of a computer 910, which may be similar to computing device 100 of FIG. 1. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media may be any available media that may be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 931 and 932 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information, and which may be accessed by the computer 910. Computer storage media does not, however, include propagated signals. Rather, computer storage media excludes propagated signals. Any such computer storage media may be part of computer 910.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 930 includes computer storage media in the form of volatile and/or nonvolatile memory such as read only memory (ROM) 931 and random-access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs, such as universal application platform 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a universal serial bus (USB) port 951 that provides for reads from or writes to a removable, nonvolatile memory 952, and an optical disk drive 955 that reads from or writes to a removable, nonvolatile optical disk 956 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and USB port 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, universal application platform 945, other program modules 946 and program data 947. Note that these components may either be the same as or different from operating system 934, universal application platform 935, other program modules 936, and program data 937. Operating system 944, universal application platform 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel may be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973 but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

Although described in connection with an example computing device 100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects of the disclosure, constitute exemplary means for providing placing and solving constraints on a 3D environment. For example, the elements described in FIGS. 5-7, such as when encoded to perform the operations illustrated in FIG. 8, constitute exemplary means for placing and solving constraints on a 3D environment.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for placing and solving constraints on a 3D environment, the system comprising:
    memory; and
    at least one processor, operably coupled to the memory, the at least one processor including:
        a converter that receives input placement constraints, wherein at least one of the input placement constraints includes a request that a plurality of poses of an asset to be inserted into a synthetic environment be determined,
        a parser that isolates the input placement constraints into translational constraints and rotational constraints,
        a spatial environment interface; and
        a pose constraint solver that utilizes at least some of the input placement constraints to determine the plurality of poses of the asset, the pose constraint solver comprising:
            a translational constraint interpreter (TCI), in communication with the spatial environment interface, that determines and samples available volumetric space in the synthetic environment to determine a set of points, in accordance with the isolated translational constraints, and
            a rotational constraint interpreter (RCI), in communication with the spatial environment interface, that determines a set of poses that satisfy the isolated rotational constraints.

2. The system of claim 1 wherein the translational constraints comprise a distance from a reference.

3. The system of claim 1 wherein the translational constraints comprise a spatial relationship relative to a reference.

4. The system of claim 1 wherein the translational constraints comprise an implicit constraint preventing two assets conflicting for a common volume.

5. The system of claim 1 wherein the rotational constraints comprise at least one selected from a list consisting of:
    direction and facing a reference.

6. The system of claim 1 wherein the converter converts the input placement constraints into a spatial query to solve.

7. The system of claim 6 wherein the input placement constraints are obtained through at least one selected from a list consisting of:
    text, speech, and an application programming interface (API).

8. A method for placing and solving constraints on a 3D environment, the method comprising:
    obtaining input placement constraints, wherein at least one of the input placement constraints includes a request that a plurality of poses of an asset to be inserted into a synthetic environment be determined;
    parsing the obtained input placement constraints to isolate translational constraints and rotational constraints from the input placement constraints;
    based at least on some of the input placement constraints, determining the plurality of poses of the asset at least by:
        determining and sampling available volumetric space in the synthetic environment to determine a set of points, in accordance with the translational constraints; and
        determining a set of poses that satisfy the rotational constraints, from the determined set of points, for assets to be inserted into the synthetic environment.

9. The method of claim 8 wherein the translational constraints comprise a distance from a reference.

10. The method of claim 8 wherein the translational constraints comprise a spatial relationship relative to a reference.

11. The method of claim 8 wherein the translational constraints comprise an implicit constraint preventing two assets conflicting for a common volume.

12. The method of claim 8 further comprising:
    generating one or more data sets including at least some determined asset data and synthetic environment data;
    associating the one or more data sets with the asset; and
    storing the one or more data sets according to respective globally unique identifiers (GUI), wherein a respective data set is retrieved based on the GUI of the data set.

13. The method of claim 8 further comprising:
    converting input comprising the obtained input placement constraints, into a spatial query to solve.

14. The method of claim 13 wherein the input placement constraints are obtained through at least one selected from a list consisting of:
    text, speech, and an application programming interface (API).

15. One or more computer storage devices having computer-executable instructions stored thereon for placing and solving constraints on a 3D environment, which, on execution by a computer, cause the computer to perform operations, the instructions comprising:
    a converter that receives input placement constraints, wherein at least one of the input placement constraints includes a request that a plurality of poses of an asset to be inserted into a synthetic environment be determined;
    a parser component for isolating input placement constraints into translational constraints and rotational constraints;
    a spatial environment interface component; and
    a pose constraint solver that utilizes at least some of the input placement constraints to determine the plurality of poses of the asset, the pose constraint solver comprising:
        a translational constraint interpreter (TCI) component, in communication with the spatial environment interface component, for determining and sampling available volumetric space in the synthetic environment to determine a set of points, in accordance with the translational constraints, and
        a rotational constraint interpreter (RCI) component, in communication with the spatial environment interface component, for determining a set of poses that satisfy the rotational constraints, from the set of points.

16. The one or more computer storage devices of claim 15 wherein the translational constraints comprise a distance from a reference.

17. The one or more computer storage devices of claim 15 wherein the translational constraints comprise a spatial relationship relative to a reference.

18. The one or more computer storage devices of claim 15 wherein the translational constraints comprise an implicit constraint preventing two assets conflicting for a common volume.

19. The one or more computer storage devices of claim 15 wherein the rotational constraints comprise at least one selected from a list consisting of:

direction and facing a reference.

20. The one or more computer storage devices of claim 15 wherein the converter converts the input placement constraints into a spatial query to solve, and wherein the input placement constraints is obtained through at least one selected from a list consisting of:

text, speech, and an application programming interface (API).

* * * * *